United States Patent

Cecchin

[15] 3,637,924

[45] Jan. 25, 1972

[54] AUTOMATIC CHROMINANCE CONTROL CIRCUIT

[72] Inventor: Gildo Cecchin, Niles, Ill.

[73] Assignee: Motorola, Inc., Franklin Park, Ill.

[22] Filed: Sept. 15, 1969

[21] Appl. No.: 857,852

[52] U.S. Cl. .......... 178/5.4
[51] Int. Cl. .......... H04n 9/48
[58] Field of Search .......... 178/5.4 AC; 330/30 D, 26, 69

[56] References Cited

UNITED STATES PATENTS

| | | | |
|---|---|---|---|
| 3,284,713 | 11/1966 | Bailey | 330/69 |
| 3,522,548 | 9/1970 | Hevner et al. | 330/30 |
| 3,497,829 | 2/1970 | Goordman | 330/30 D |
| 3,435,131 | 3/1967 | Krug | 178/5.4 |
| 3,517,114 | 6/1970 | Carpenter | 178/5.4 |
| 3,517,115 | 6/1970 | Willis | 178/5.4 |

*Primary Examiner*—Robert L. Griffin
*Assistant Examiner*—Barry Leibowitz
*Attorney*—Mueller & Aichele

[57] ABSTRACT

An automatic chrominance control (ACC) circuit for a color television receiver is used with a chrominance amplifier in the form of an integrated circuit differential amplifier operated with a constant current source. In order to reduce the number of bonding pads required for the amplifier, the ACC control voltage and the input signal are applied in common to a bonding pad coupled to the base of one of the transistors of the differential amplifier. The other transistor is supplied with a biasing potential, and a resistor interconnects the bases of the transistors to prevent signal lockout by causing the transistor to which the signals are applied always to conduct the same or more current than the other transistor. Increased conductivity of the first transistor causes a reduced gain thereof due to the increased impedance appearing on its emitter when the other transistor is rendered less conductive.

8 Claims, 2 Drawing Figures

INVENTOR
GILDO CECCHIN
BY
Mueller, Aichele & Rauner
ATTYS

AUTOMATIC CHROMINANCE CONTROL CIRCUIT

BACKGROUND OF THE INVENTION

The standard NTSC color television signal is composed of a color information signal component, phase and amplitude modulated on a color subcarrier to represent hue and saturation, respectively; a brightness component; and a burst signal component synchronized with the color information subcarrier.

In the color television receiver, separate channels to the demodulator are provided for the brightness and color components. The burst signal is separated from the remainder of the composite signal to provide a reference signal used for controlling the synchronous demodulation of the modulated color components. Since the saturation of the colors in the image reproduced by the receiver is dependent upon the ratio of the amplitudes of the color subcarrier waves and the brightness signal component, it has been found desirable to utilize a separate or selective gain control of the color processing channel in addition to any automatic gain control apparatus similar to that which is employed in a conventional black and white television receiver. Since the amplitude of the burst component bears a direct relationship with the amplitude of the color information component of the composite signal, a selective automatic gain control for the chrominance channel is often derived from the amplitude of the burst component. This selective gain control function for the color processing channel is designated as the "automatic chroma control" (ACC) function.

With the use of integrated circuits for the color processing portion of a television receiver, it is desirable to use differential amplifier configurations for the color processing amplifier stages of the receiver. When such an amplifier configuration is employed, it generally is the practice to supply the ACC voltage to the base or control electrode of one of the transistors of the amplifier, with the color input signal being applied to the other transistor of the differential amplifier or to a third transistor coupled in common to the collectors of the differential amplifier transistors. When this is done, separate bonding pads are required for connecting the ACC voltage and the input signal to the integrated circuit amplifier. Integrated circuit chips are packaged in standard packages having predetermined numbers of bonding pads providing access to the chip, so that efficient utilization of a package by a given chip is determined in large part by minimizing the number of bonding pads required for the chip. As a consequence, it is desirable to provide an ACC control function for an integrated circuit amplifier without requiring an additional bonding pad for the chip on which the amplifier is formed.

SUMMARY OF THE INVENTION

Accordingly it is an object of this invention to provide an improved automatic chroma control amplifier circuit.

It is another object of this invention to minimize the number of bonding pads required for an integrated circuit amplifier having a gain control voltage applied thereto.

It is a further object of this invention to control the gain of a differential amplifier by a gain control voltage applied to the same terminal used for supplying input signals to the amplifier, with a provision for preventing lockout of the amplifier when the gain control voltage is derived from the output of the same amplifier.

An automatic chroma control (ACC) circuit for a color television receiver employs a differential amplifier, having a pair of amplifying devices, as the color processing amplifier. A constant current source is established for the amplifier, and one of the amplifying devices is provided with a bias potential for establishing the operating level of the amplifier. The composite signal, including the color information component and the burst component, is applied along with the DC/ACC control voltage to the control electrode of the other of the amplifying devices.

A provision is made for interconnecting the input or control electrodes of the amplifier devices in order to prevent lockout of the amplifier when no input signals are present, since the control voltage is derived from the same amplifier device to which the signals are applied. This interconnections insures that the amplifier device receiving the input signals conducts an amount of current equal to or greater than the current conducted by the other of the amplifying devices being provided with the reference signal.

In a preferred form of the invention the differential amplifier is an integrated circuit amplifier, and combining the ACC control signal with the input signal enables the number of bonding pads required for the integrated circuit chip of which the amplifier is a part to be reduced by one.

DETAILED DESCRIPTION

Figures 1, 2:
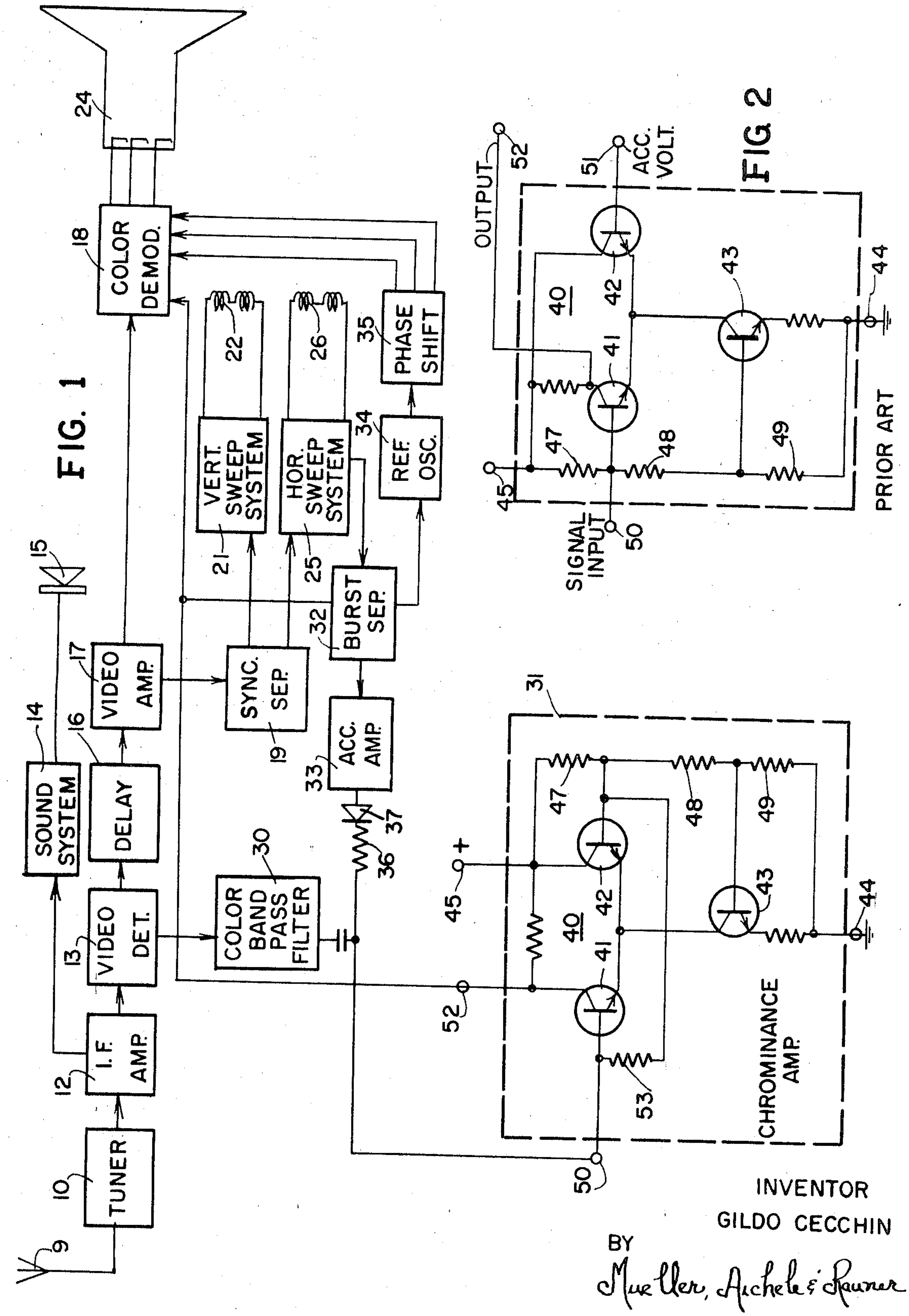
FIG. 1 is a schematic diagram partially in block form of a television receiver using an amplifier circuit in accordance with a preferred embodiment of the invention.
FIG. 2 illustrates a prior art type of amplifier circuit over which the circuit shown in FIG. 1 is an improvement.

Referring now to FIG. 1, there is shown a color television receiver including an antenna 9 supplying input signals to a tuner 10 which receives and converts the incoming television signals to an intermediate frequency signal. The tuner 10 may include, for example, RF stages of the receiver as well as the first detector or mixer and associated local oscillator. The output intermediate frequency signal developed by the tuner 10 is coupled through an intermediate frequency amplifier stage 12 to a video detector 13. The output of the intermediate frequency amplifier also is supplied to a sound system 14, which supplies the amplified audio signals to a loud speaker 15. The brightness synchronizing components in the detected composite video signal are delayed in a delay circuit 16, for purposes well known to those skilled in the art, and are applied to a video amplifier 17, the output of which is supplied to a color demodulator circuit 18.

The composite signal provided by the video amplifier 17 has video information components with a blanking interval reoccuring at the horizontal rate of 15,734 Hz. A horizontal synchronizing pulse appears at the beginning of each blanking interval, immediately followed by a burst signal component. A vertical synchronizing pulse also appears in the composite video signal at a 60 Hz. rate and is separated from the remainder of the composite signal in a synchronizing pulse separator circuit 19. The separated vertical synchronizing pulses then are applied to a vertical sweep system 21, which develops a vertical sawtooth sweep signal and in the vertical deflection windings 22 placed on the neck of the cathode-ray tube 24 for vertically deflecting the electron beams therein.

The horizontal synchronizing pulse also is separated from the remainder of the composite signal in the pulse separator circuit 19 and is supplied to a horizontal sweep system 25, which develops the horizontal sweep signals in the horizontal deflection winding 26 placed on the neck of the cathode-ray tube 24 for horizontally deflecting the electron beam in the cathode-ray tube. The composite signal obtained from the video detector 13 also is supplied to a color band-pass filter 30 which has a band-pass characteristic for selectively passing only the chrominance components of the detected composite signal, the chrominance components comprising the color subcarrier and its side bands and the burst signal component. The output of the filter 30 then is applied to a chrominance amplifier 31, the output of which in turn is supplied to the color demodulator 18 and to a burst separator circuit 32. Operation of the burst separator circuit 32, which may be a suitable gate circuit, is controlled by gating pulses obtained from the horizontal sweep system 25, which causes the burst separator gate 32 to pass signals only during the recurring time intervals occupied by the color synchronizing burst components.

These burst components then are obtained from the burst separator circuit 32 and are used to phase-lock or synchronize a color reference oscillator 34, the output of which is supplied to a phase-shift circuit 35 to produce the three phases of color reference signal to the color demodulator circuit 18 for demodulating the red, blue and green color signal components, applied to the cathodes of the three electron guns of the three beam cathode ray tube 24. The synchronous color demodulator 18 directly produces the three color signals needed to drive the cathodes of the cathode-ray tube 24.

The output of the burst separator circuit 32 also is supplied to an automatic chroma control (ACC) amplifier circuit 33 which develops a DC control voltage proportional to the amplitude of the burst signal component obtained from the burst separator circuit 32. This DC control voltage then may be utilized to control the gain of the chrominance amplifier 31, with the output of the ACC amplifier 33 being applied through a coupling resistor 36 and an isolating diode 37 to the input terminal of the chrominance amplifier 31 in common with the composite signal passed by the band-pass filter 30.

In accordance with the preferred embodiment of the invention shown in FIG. 1, the chrominance amplifier 31 is an integrated circuit amplifier formed on an independent chip of its own or as part of a chip including other portions of the color processing circuitry of the television receiver. When an integrated circuit configuration is used, it is desirable to conserve to as great an extent as possible the number of bonding pads or external connections required for the chip in order to obtain most efficient utilization of the standard packaging techniques presently being employed with integrated circuit package. Thus, if it is possible to combine functions normally requiring two or more bonding pads to utilize a single bonding pad, the required number of bonding pads for the integrated circuit can be reduced.

Referring now to FIG. 2 there is shown a conventional type of integrated circuit amplifier of a type which may be used as a chrominance amplifier in a color television receiver having an ACC circuit. The amplifier shown in FIG. 2 includes a differential amplifier 40 having a pair of NPN-transistors 41 and 42, the emitters of which are connected in common to the collector of a third transistor 43 having its emitter connected through an emitter resistor to a bonding pad 44 connected to ground. The collector of the transistor 41 is connected through a resistor to a second bonding pad 45, which is shown connected to a source of positive operating potential. The collector of the transistor 42 is connected directly to the bonding pad 45. A voltage divider consisting of three resistors 47, 48 and 49 is connected between the bonding pads 44 and 45 for supplying a DC biasing potential to the base of the transistor 41 and to the base of the transistor 43, which is operated as a constant current source.

Input signals, such as obtained from the output of the color band-pass filter 30 shown in FIG. 1, are applied through a third bonding pad 50 to the base of the transistor 41; and the ACC control voltage, such as is obtained from the output of the ACC amplifier 33 of FIG. 1, is applied through a fourth bonding pad 51 to the base of the control transistor 42 of the differential amplifier 40. In the circuit shown in FIG. 2, the transistor 43 operates as a current source (equivalent to a very high value resistor of the order of 100,000 ohms or more). When the input signals are applied to the base of the transistor 41, the collector current of the transistor 41 is modulated accordingly, with the output voltage appearing at the collector of the transistor 41 on a bonding pad 52.

Gain reduction of the amplifier transistor 41 is accomplished by reducing the current flow through the transistor 41. This is accomplished for increasing DC levels of the ACC voltage applied to the bonding pad 51 rendering the transistor 42 more conductive which in turn reduces the conductivity of the transistor 41, since the current drawn by the constant current source 43 is the same at all times. When the current flowing through the transistor 41 is reduced, the junction impedance of the transistor 41 is increased, resulting in a drop in the gain of the transistor 41, which is the desired control function. When the ACC voltage applied to the terminal 51 drops, the opposite occurs; and the gain of the transistor 41 is increased due to the increased conductivity of that transistor and the reduced conductivity of the transistor 42. In the absence of an input signal, the ACC voltage applied to the bonding pad 51, of course, drops to a very low value, causing the gain of the transistor 41 to be at a maximum in readiness for the application of further signals to the input terminal 50. If desired, a color killer circuit could be employed in order to prevent the appearance of output signals from the collector of the transistor 41 for this "no color signal input" condition.

Referring again, to FIG. 1, there is shown a chrominance amplifier 31 which is similar to the amplifier circuit shown in FIG. 2 but which utilizes one less bonding pad and operates in a different manner to accomplish the same result of automatic chroma control of the amplifier circuit 31. In the circuit shown in FIG. 1 the basic chrominance amplifier is similar to the one shown in FIG. 2 and includes a differential amplifier 40 with a pair of NPN-transistors 41 and 42. The constant current source transistor 43 is connected to the emitters of the transistors 41 and 42 in the same manner as shown in the circuit of FIG. 2. In the amplifier circuit of FIG. 1, however, the junction of the resistors 47 and 48 of the voltage divider is connected to the base of the transistor 42 instead of being connected to the base of the transistor 41 as shown in FIG. 2. In addition, this junction is connected through an isolating resistor 53 to the base of the transistor 41 to supply a biasing potential to the base of the transistor 41. The resistance of the resistor 53 is high relative to the resistance of the resistors 47, 48 and 49 to decouple the bases of the transistors 41 and 42 of FIG. 1 from one another with respect to inputs supplied to the bonding pad 50. When this is done, the ACC voltage obtained from the output of the ACC amplifier 33 no longer is applied through a bonding pad 51 to the base of the transistor 42, but is applied in common with the output of the color band-pass filter 30 to the signal input bonding pad 50; and the bonding pad 51 shown in FIG. 2 has been eliminated.

The operation of the chrominance amplifier 31 shown in FIG. 1 is such that as the ACC voltage increases, the conductivity of the input transistor 41 also increases accordingly. This would appear to increase the gain of the transistor 41 which would be an undesirable condition. The impedance at the emitter of the transistor 41, however, increases as the conductivity of the transistor 41 increases since the impedance at the emitter of the transistor 41 is formed by the impedance of the constant current transistor 43 (as stated previously, of the order of 100,000 ohms) and the junction impedance of the transistor 42. When the transistor 41 is rendered increasingly conductive, the transistor 42 is rendered correspondingly less conductive, thereby increasing the junction impedance of the transistor 42 which appears at the emitter of the transistor 41. As a consequence, for a maximum ACC voltage applied to the terminal 50 the gain of the transistor 41 is at a minimum, even though its conductivity is at a maximum. This operation is the reverse of the operation discussed previously in conjunction with FIG. 2.

By applying the ACC voltage to the same input bonding pad 50 that is used for applying the input signals obtained from the band-pass filter 30, a lockout of the input could occur, since with a low-input signal or no input signal, no ACC control voltage is produced. Under this condition of operation, using a circuit configuration such as that shown in FIG. 2, the current through the constant current transistor 43 all would be shunted into the transistor 42, biasing the transistor 41 into cutoff. Then as the input signal amplitude is increased, the transistor 41 would have no means of regaining control of the circuit.

In order to prevent this lockout condition from occurring, the resistor 53 is provided to assure that the current flowing through the transistor 41 is always equal to or greater than the current flowing through the transistor 42. The resistor 53 couples the biasing potential applied to the base of the transistor 42 to the base of the transistor 41; so that in the absence of input signals, the transistors 41 and 42 are equally biased and conduct equal amounts of current. Thus, in the absence of an input signal applied to the terminal 50 and in a corresponding absence of an ACC control voltage applied to the terminal 50, the transistor 41 is biased for maximum gain, which occurs when it is equally conductive in the transistor 42. As the amplitude of the input signal is increased, the ACC voltage from the ACC amplifier 33 rises and causes corresponding reductions in the gain of the transistor 41, as the transistor 41 is rendered increasingly conductive and the transistor 42 is correspondingly rendered decreasingly conductive.

By the use of the high resistance cross-coupling resistor 53 between the bases of the transistors 41 and 42, it is possible to reduce by one the number of bonding pads required for the integrated circuit chip of which the chrominance amplifier 31 is a part. The amplifier 31 may be an independent integrated circuit or a part of a larger integrated circuit including other portions of the television receiver circuit. The bonding pad reduction is the same in either case. It also should be noted that the amplifier 40 may be one of several stages to obtain the proper amount of amplification of the color signal.

I claim:

1. In color television receiver for utilizing composite signals comprising at least a subcarrier component modulated in phase and amplitude to represent hue and saturation of a color image and a color reference burst signal component, said receiver including means responsive to the burst signal component to develop a DC control voltage varying in amplitude with amplitude variations of the burst signal component, an amplifier circuit including in combination;

first and second voltage supply terminals for connection across a source of operating potential;

differential amplifier means including first and second amplifier devices, each having first, second and control electrodes, with the first electrodes each being connected with said first supply terminal;

a source of substantially constant current connected between said second supply terminal and the second electrodes of said first and second amplifier devices;

means for connecting an operating bias potential to the control electrode of said second amplifier device;

means connected with the first electrode of one of said amplifier devices for utilizing output signals appearing thereon;

decoupling impedance means interconnecting the control electrodes of said first and second amplifier devices; and means for supplying the composite signal and the DC control voltage to the control electrode of said first amplifier device, the DC control voltage varying the gain of the amplifier circuit, said decoupling impedance means causing said first and second amplifier devices to conduct substantially equal currents in the absence of input signals or control voltage applied to the control electrode of said first amplifier device.

2. The combination according to claim 1 wherein said first and second amplifier devices are first and second transistors having collector, emitter and base electrodes corresponding to the first, second and control electrodes, respectively.

3. The combination according to claim 2 wherein the amplitude of the DC control voltage increases for increases in the amplitude of the burst signal component to drive the first transistor deeper into conduction, causing more of the current from the constant current source to be shunted therethrough, thereby biasing the second transistor toward cutoff, causing the impedance at the emitter of the first transistor to rise, reducing the gain of the first transistor accordingly.

4. The combination according to claim 2 wherein the first and second transistors and the constant current source all are part of the same integrated circuit ship and said first and second supply terminals are first and second bonding pads, respectively, with said first bonding pad coupling a point of reference potential to the constant current source, and said second bonding pad coupling a source of operating potential to the collectors of the first and second transistors, and further including a third bonding pad for coupling the combined input signal and DC control voltage to the base of the first transistor.

5. The combination according to claim 4 wherein the means for utilizing output signals further includes said means responsive to the burst signal component for developing the DC control voltage.

6. A circuit for providing an automatic gain control function for an integrated circuit amplifier using a limited number of bonding pads including in combination:

first and second bonding pads for connection across a source of operating potential;

an integrated circuit differential amplifier including first and second transistors, each transistor having collector, emitter and base electrodes, the collector electrodes each being coupled to a said first bonding pad;

a source of substantially constant current on said integrated circuit and connected between the emitter electrodes of the first and second transistors and said second bonding pad;

means connected between said first and second bonding pads for providing an operating bias potential for the base electrode of at least said second transistor;

means connected with the collector electrode of one of said transistors for utilizing output signals appearing thereon, and including means responsive to the magnitude of said output signals for developing a DC control voltage;

means for supplying input signals and said DC control voltage in common to the base electrode of said first transistor, the DC control voltage varying the gain of the amplifier circuit.

7. The combination of claim 6 wherein said means for utilizing said output signals is connected with the collector electrode of said first transistor and said means for providing an operating bias potential comprises voltage divider means having an output tap coupled with the base electrode of said second transistor, the combination further including resistance means interconnecting the bases of the first and second transistors, the resistance means being formed as a part of the same integrated circuit of which said first and second transistors are a part and having a value of resistance which is high relative to the resistance of said voltage divider by an amount sufficient to decouple the bases of the first and second transistors to cause the current flow through said first transistor to be equal to or greater than the current flow through said second transistor.

8. The combination of claim 7 further including a third bonding pad coupled with the base of said first transistor and connected to receive said input signals and said DC control voltage.

* * * * *